Jan. 22, 1924.
W. G. R. BRAEMER ET AL
1,481,251
HUMIDITY CONTROLLER
Filed Jan. 24, 1923    2 Sheets-Sheet 1
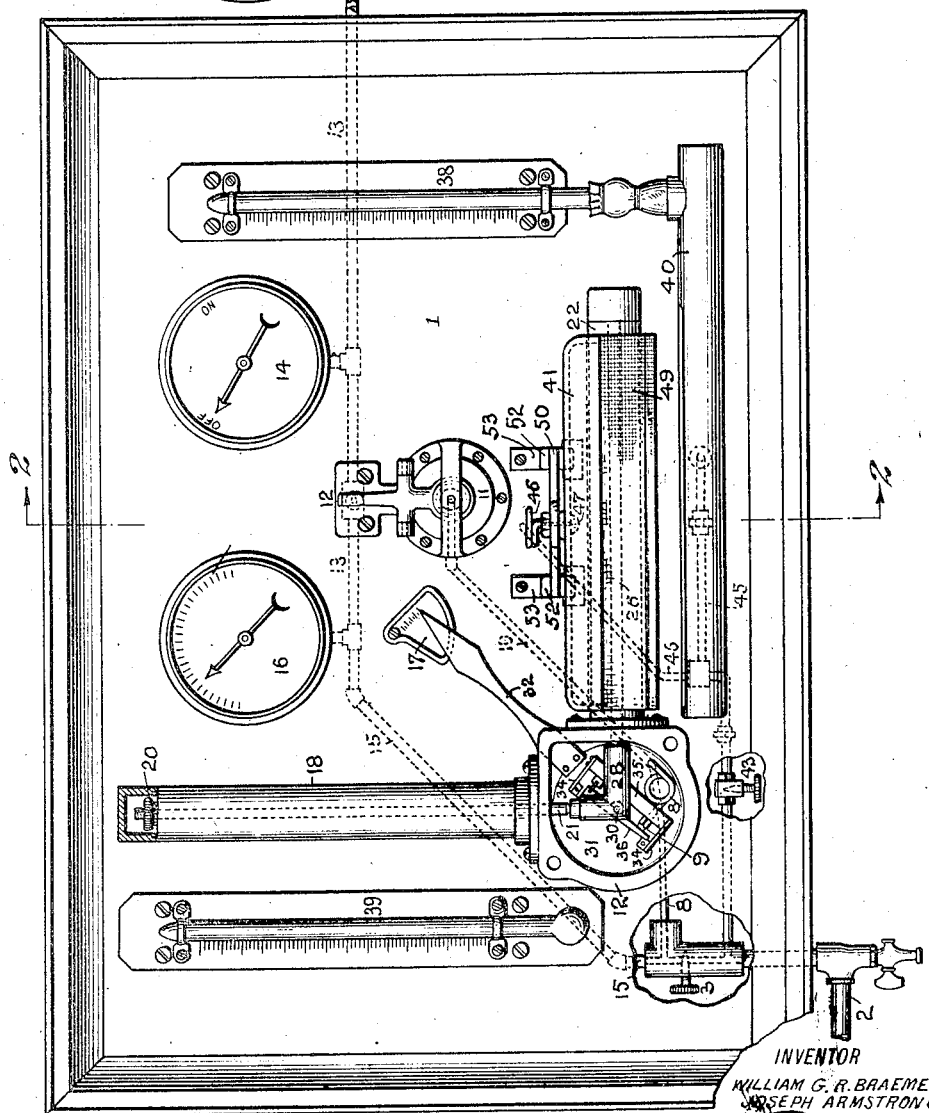
Fig.1.
INVENTOR
WILLIAM G. R. BRAEMER.
JOSEPH ARMSTRONG.
BY 
ATTORNEY Jan. 22, 1924.
W. G. R. BRAEMER ET AL
1,481,251
HUMIDITY CONTROLLER
Filed Jan. 24, 1923    2 Sheets-Sheet 2
Fig. 2.
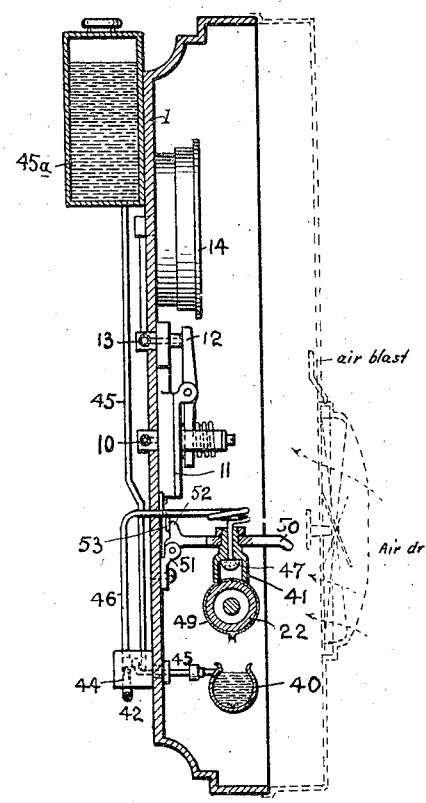
Fig. 3.
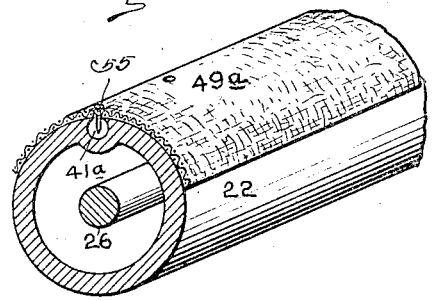
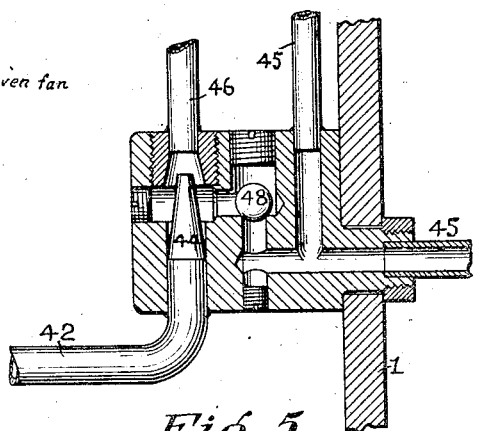
Fig. 5.
Fig. 4.
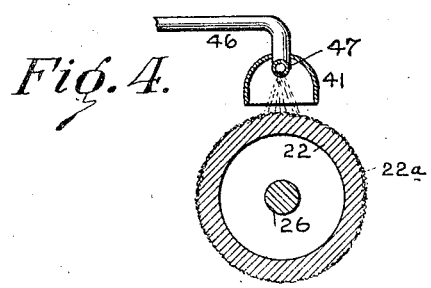
INVENTOR
WILLIAM G. R. BRAEMER.
JOSEPH ARMSTRONG.
BY
ATTORNEY Patented Jan. 22, 1924.

1,481,251

UNITED STATES PATENT OFFICE.

WILLIAM G. R. BRAEMER, OF CRANSTON, RHODE ISLAND, AND JOSEPH ARMSTRONG, OF MALDEN, MASSACHUSETTS, ASSIGNORS TO AMERICAN MOISTENING COMPANY, A CORPORATION OF MAINE.

HUMIDITY CONTROLLER.

Application filed January 24, 1923. Serial No. 614,547.

*To all whom it may concern:*

Be it known that we, WILLIAM G. R. BRAEMER and JOSEPH ARMSTRONG, both citizens of the United States, and residents of Cranston, county of Providence, State of Rhode Island, and Malden, county of Middlesex, State of Massachusetts, respectively, have invented an Improvement in Humidity Controllers, of which the following is a specification.

Heretofore, it has been customary, in the construction of wet and dry bulb hygrometers or humidity controllers adapted for use for regulating the humidity condition in textile, paper making and other mills, to have the wet bulb element covered with a textile fabric which extends downward into a trough containing water for the purpose of maintaining the wet bulb element of the instrument in a moist condition equivalent in effect to saturated air for all temperatures, the said instrument having its wet and dry bulb elements mechanically coupled to operate upon a unitary device, such as a valve or electrical contact adapted to operate in accordance with the psychrometric tables, whereby the automatic control of the valve or electrical contacts may put into operation suitable means for turning on and shutting off the water supply to the vaporizing or humidifier means or otherwise controlling humidification for maintaining a predetermined relative humidity or percentage of cotton or wool regain. The objection to the use of a textile covering about the wet element of the hygrometer resides in the fact that it has a tendency to become clogged with dirt, not only from soot and other matters floating in the atmosphere, but also from any impurities which may be conveyed upward into the textile covering from the water into which its lower end continually dips. This clogging of the textile covering with solid matters, in time renders it so dense to the atmosphere that proper evaporation due to the normal conditions of the air is interfered with and consequently the wet bulb element of the instrument no longer accurately responds to the dew point conditions of the atmosphere. The more the fabric is clogged with dirt, the less accurate is the instrument and it, therefore, fails to operate in accordance with the requirements established by the psychrometric tables; and consequently, even though the instrument is set or adjusted to maintain a given relative humidity or percentage of cotton or wool regain, it would not, under these circumstances, maintain the predetermined conditions with a uniformity necessary to meet proper commercial requirements.

The object of our invention is to construct the means for maintaining the wet bulb element of a hygrometer in a proper moist condition under continued use, so that the instrument shall be accurate in its response to humidity changes in the atmosphere; and our object is also to so construct the textile covering of the wet element, if used, that it may, from time to time, be quickly and easily removed and after cleansing be replaced, an operation which is not readily possible when the wet bulb element has been provided with a textile covering as heretofore.

More particularly, our invention employs means for automatically supplying water in suitable form to the upper part of a wet bulb element of a hygrometer and permit the same to flow over the said element in a downward direction by gravity, assisted by capillary attraction where a textile or other porous covering or surrounding surface of the element is provided.

While the water may be supplied to the wet bulb element in controlled quantities under gravity or pressure, it is desirable that such flow shall only occur when the instrument is in actual commercial operation and, to secure this result, we prefer to employ air pressure, itself controlled by the instrument and caused to operate the valves or means for insuring the control of the supply of vapor to the atmosphere for increasing or decreasing its humidity, said air pressure utilized for transferring water from a reservoir provided on the instrument to a level above the wet bulb element wherein the air pressure is employed to lift and deliver the water (preferably in a spray) within a confining cap or hood arranged in contact with the extreme upper portion of the wet bulb element. While the moisture is preferably only sufficient to maintain the wet bulb element in a constantly wet condition with free opportunity for evaporation, the excess of moisture that may drip from the under part of the wet element may be received in the water trough or drained out of circulation as preferred, the water trough, when employed, being the immediate means for supplying water to the wet bulb element. This water trough may be also utilized in connection with the wet bulb thermometer with which the instrument is usually supplied, being one of the thermometers necessary to enable the reading of the wet and dry bulb temperatures when adjusting the hygrometer controlling system to which our invention more particularly relates.

More specificaly, our invention, in its preferred form, comprehends a wet bulb hygrometer element of hard rubber or other suitable material capable of expansion and contraction under varying temperature conditions of the air, combined with an inverted cap or hood of small cross section adapted to the extreme upper portion thereof and forming between its lower edge and the surface of the wet bulb element a more or less snugly fitting joint whereby the water or spray supplied to the interior of the hood may find its way to the upper surface of the wet bulb element and be distributed along its length with a reasonable degree of uniformity, so that as it passes downward under the action of gravity (assisted by capillary attraction where a porous covering is provided), the entire outer surface of the wet bulb element will be maintained in a uniformly moist condition and responsive to the varying tendency to evaporation due to the hygrometric changes in the surrounding atmosphere. Furthermore, by our improved construction, the lower part of the wet bulb element is unobstructed and consequently the air may circulate freely about the element and in that manner cause a proper evaporation of the moisture with the result that the said element is sensitive and responsive to the varying atmosphere humidity changes.

As before stated, the wet bulb element of our improved hygrometer may, if desired, be provided with a textile covering such as a snugly fitting woven or knitted tube which may be slipped on and off, longitudinally over the element; and while cooperating with the hood to insure a more uniform distribution of the moisture upon the surface of the wet bulb element, the said covering may be easily removed for cleansing and readily replaced, the cap or hood being supported in such manner that it may rest lightly in place and adapted for permitting the introduction or removal of the said textile covering or sleeve in respect to the element. Instead of providing a textile covering extending entirely about the element, a covering in flexible sheet form extending over the top and half way down each side may be employed, as in this case, the distribution of the water to the lower edges of the textile covering will insure a proper moistening of the lower half of the element. It is also to be understood that in place of employing a textile covering which is removable from the wet bulb element, the outer surface or part thereof of the said element itself may be made more or less porous so as to provide a capillary structure which will perform approximately the same function as the textile covering, the said structure, however, being of a rigid character and, therefore, capable of being readily washed or scrubbed from time to time with a small brush (such as a large sized tooth brush), for insuring it being cleansed. It is further apparent that instead of forming the capillary structure upon the outer surface of the wet bulb element, a fine metallic tubular meshed sleeve may be provided which snugly fits to the surface of the wet bulb element, but is relatively loose thereon so as not in any manner to control the actual expansion and contraction of said element, it being customary that the wet and dry bulb elements are of the same materials so as to have corresponding co-efficience of expansion.

While it is desirable to provide the cap or hood as a separable part from the wet bulb element, a modification of our invention may embody a construction in which the moisture may be supplied directly to a longitudinal passage formed in the upper part of the element itself and the water caused to flow upward to the textile or other covering arranged about the element in the manner referred to above.

Our invention consists of further details of construction which, together with the features above specified are fully described hereinafter and more particularly defined in the claims.

Referring to the drawings: Fig. 1 is a front elevation of a humidity controlling means embodying a hygrometer with our improvements applied thereto; Fig. 2 is a vertical section of the same on line 2—2, with an air driven fan for air circulation shown in dotted lines; Fig. 3 is a cross sectional view of the wet element of a hygrometer showing a modification of our invention; Fig. 4 is a similar cross section of a further modification; and Fig. 5 is a sectional view of the water circulating means.

While our invention is applicable to hygrometers generally, it is shown more particularly, by way of example, as applied to a hygrometer of the general construction illustrated in Letters Patent No. 1,122,077, dated December 22, 1914. A brief description of the hygrometer shown will be made preliminary to entering into a description of the present improvements which are shown in connection therewith.

The dry element 18 is made of hard rubber or other suitable expansible material and is mounted on a casing 12 so that it stands perpendicularly. At the top of this element is a cap in which is a nut 20 which may be adjusted against the upper end of a rod 21 made of a metal which does not expand or contract under changes of temperature. The wet element 22 is composed of similar expansible material to that employed in the dry element and its cap may similarly be provided with adjusting screws (not shown) to adjust the position of the non-expansible rod 26. This rod 26 has on its inner end a frame 28 to which is attached a pin 30. The frame 28 has at its end an upward extension and in a recess in which the lower end of the non-expansible rod 21 of the dry element rests. The pin 30 is secured to a ratio valve lever 36 which is adapted to close the mouth of an air relief nozzle 9 of the pipe 8. When this nozzle is closed, the pressure of the air builds up in the pipe 8 and extends to a motor device 11 of a mechanism known as a relay relief valve whose function is to turn off the humidifiers to reduce the humidity condition of the atmosphere. When the lever 36, under the action of the wet and dry bulb elements, is moved to open the nozzle 9, the air pressure thus built up is released and the said relay valve, operating under its spring, automatically turns the humidifiers on to increase the humidity condition of the air in the room or compartments in which the humidity condition is to be controlled. The ratio valve 36, aside from being pivoted to the frame 28 by the pin 30, is flexibly fulcrumed to a frame 35 which also carries the relief nozzle 9. This frame 35 is connected to a pivoted plate 31 within the casing 12 by means of yielding supports 34, and said plate, together with the valve devices connected thereto, is adjustable about an axial point approximately coincident with the position of the pin 30 by means of a lever 32 which also constitutes a pointer which traverses a suitable scale 17 designating percentages of relative humidity or of cotton or wool regain, as may be desired or preferred. This adjustment of the plate 31, together with the valve mechanism relatively to the direction of action by the wet and dry bulb elements of the hygrometer, provides for a ratio adjustment to cause the instrument to respond for predetermined relative humidity conditions, whether the same is in terms of relative humidity of the air or of percentages of cotton or wool regain. The wet element heretofore has been surrounded with a textile covering which dips down into a trough 40 containing water and which, by capillary attraction, enables the textile covering to be maintained in a wet condition and thereby subject the wet element 22 also to a continually wet condition while being subjected to the effect of evaporation and chilling dependent upon the relative humidity condition of the atmosphere. This same trough 40 provides the source of moisture for a wet bulb thermometer 38 which is made a portion of the completed instrument. The instrument may also be supplied with a dry bulb thermometer 39, whereby the wet and dry bulb temperatures may be read at any time for computing the amount of moisture in the air and thereby determining the necessary adjustment required for the hygrometer mechanism first described.

Reference will now be made to the various adjuncts and pipe connections which are employed in respect to the relay valve mechanism for completing the apparatus necessary for controlling the humidifying devices. Compressed air of a pressure of ten to twelve pounds, for example, is supplied by a pipe 2 for operating the motor device 11 of the relay relief valve 12 and is conducted through a restriction valve 3 and then delivered to a pipe 8 which has communication with the pipe 10 leading to the said motor device 11 of the relay relief valve, the said pipes 8 and 10 being in communication with the nozzle 9 of the ratio valve mechanism of the hygrometer for venting the said pipes of air pressure when required. The relay valve mechanism is well known and comprises essentially a diaphragm motor 11 which operates a relief valve 12, said motor being operated in one direction by the air pressure supplied thereto by the pipe 10 for the purpose of closing the said relief valve, and operating in the other direction by a spring when the air pressure in the pipe 10 is reduced by the relief provided by the ratio valve. The relay valve mechanism is not shown in detail, as it does not form an essential part of our present invention. The compressed air, after passing the restriction valve 3, finds its way into the pipe 15 which leads to and communicates with a pressure gage 16 for indicating the pressure of the air which builds up in the said pipe 15 when the relief valve 12 of the relay valve mechanism is closed to the atmosphere. When the relay relief valve 12 is closed, the air pressure continues to build up and extends through the pipe 13 as a continuation of pipe 15 and ultimately communicates with the pipe 4 extending out to the humidifiers and provided with a diaphragm motor 5 which controls the operation of a valve 6 arranged in a pipe 7, the said pipe and valve directly controlling a water supply to the humidifiers or, if desired, controlling the supply of air pressure which may be employed for spraying water, according to the particular character of humidifying apparatus which may be used. It will suffice, for the purposes of our invention, to state that the valve 6 controls the pressure supplied to the humidifier system without regard to the particular medium which passes through the valve. Ordinarily, a valve of this character is opened by a spring and is closed by the air pressure building up back of the diaphragm motor; we, however, are not concerned with the particular valve mechanism employed, as it may be of any character suitable for the purpose. A gage 14 may be employed in connection with pipe 13 which will indicate by its pointer when the pressure in the pipe 13 varies corresponding to the requirements when the humidifiers are on or off.

Referring, more particularly, to our present invention as applied to a hygrometer such, for example, as that above described, the water employed for maintaining the wet element in a moist condition is delivered in a positive manner to the upper portion of said element and, by gravity alone or in association with capillary action, is caused to flow downward over the element for maintaining it in a moist condition during the normal operation of the apparatus. We, furthermore, prefer to supply the water to the wet element by means of a compressed air jet which will force the water upward to the place of delivery above the wet element and at the same time provide the necessary power for spraying the said water, so that it may be delivered to the wet element in a finely sub-divided condition. Instead of requiring the compressed air to lift the water while at the same time spraying it, the water may be fed, by gravity, and the air jet employed alone for spraying it within an enclosure above the wet element to insure proper distribution.

Referring more particularly to Fig. 1, 41 is an inverted cap or hood which is shaped at its lower part to fit the upper curved surface of the wet element 22 and withal not so tightly as to interfere with the spray water working downward beneath its edges to flow over the outer surface of the wet element. Preferably, the wet element is immediately above the upper and open part of the trough 40, so that any water which might drop may fall into the trough, this provision being desirable in that it is not feasible to insure the exact amount of water which would cover the wet element and yet be wholly evaporated in the normal operation. The water to be sprayed in the cap or hood is received by a pipe 45 (also communicating with the trough 40) and upon passing through the check valve 48, is projected upward through the pipe 46 into the spraying nozzle 47 within the cap or hood 41 by means of a blast pipe 44 connecting with the compressed air pipe 2 by means of a pipe 42 containing a needle valve 43 by which the amount of compressed air to be employed for lifting the water may be controlled. The water lifted is intermingled with the compressed air, the latter spraying the water within the hood or cap, and also assisting in causing the same to pass beneath the edges of hood to the outside thereof. The water supplied by the pipe 45 is received from a closed tank 45ª at the back of the supporting board or frame 1 of the instrument or from any other source found convenient. By means of the needle valve 43, the extent of water supply to the cap or hood may be regulated and if the adjustment is carefully done, the amount of water supplied may be accurately regulated to the requirements.

The wet element may, if desired, be provided with a sleeve 49 of textile material down which the moisture will travel by the combined action of gravity and capillary attraction. In the use of a textile sleeve 49 in this manner, it is manifest that by lifting the cap or hood slightly, the sleeve may be slid off for washing or cleansing from time to time and quickly replaced. Moreover, owing to the fact that the sleeve is cylindrical and does not hang down into the trough, it is manifest that the circulation of the air about the wet element is more free than where the surrounding wick or textile covering was as heretofore employed and hung down into the trough providing a positive barrier against cross air currents. The use of a porous textile, fibrous, metallic, or other covering about the wet element has the advantage of insuring a more uniform distribution of the moisture and also for holding a film of water of greater thickness in contact with the element than would in many cases occur where a spray alone was employed within the hood as a means of providing the moisture required. In place of forming the porous covering separate from the element and detachable thereon, the outer surface of the element itself may be formed with a more or less capillary surface which may be directly washed from time to time, such construction, for example, being illustrated in Fig. 4, in which 22 is the element and 22ª is the porous outer surface thereof.

While the hood or cap 41 may be separated along the upper portion of the wet element 22 in any suitable manner, I have shown in Fig. 2 a convenient construction for this purpose. In the means shown, the hood is clamped to an arm 50 which is hinged to a plate 51 attached to the supporting board or plate 1 of the instrument. The arm 50 is also provided with a heel extension 52 which presses upon a leaf spring 53 also secured to the board or plate 1 and operating to apply pressure to the arm 50 so as to press the hood 41 snugly upon the wet element 22 with a gentle pressure. This construction also enables the hood to be lifted slightly for cleansing or for introducing or removing the cylindrical textile covering 49 if the same be employed. The pipe 46 for feeding the water to the nozzle 47 within the hood, may be arranged in any flexible manner and, if desired, may be coiled on itself sufficiently to give the desired elasticity. Any other suitable manner of supporting the hood or cap may be employed.

In place of providing a hood or cap above the wet element, the same may be provided with a longitudinal groove 41$^a$ having a narrow slit opening upward, as indicated in Fig. 3. Arranged over the uper part of the element is shown a textile covering 49$^a$ which may terminate approximately slightly above a transverse horizontal plane through the axis of the element. The water from the pipe 46 is delivered into the end of the longitudinal groove 41$^a$ and is caused to flow upward into contact with the textile covering 49$^a$ and in that manner, under pressure and capillary action. spread downward on each side of the element for maintaining it in a moist condition. This covering may be maintained from shifting circumferentially upon the element by pins 55 extending through the covering into the slot of the longitudinal groove. It is manifest that the covering may be removed from time to time for cleansing, if so desired.

In the operation of the device, the dry and wet elements 18 and 22 cooperate by their expansion and contraction to actuate the ratio valve mechanism 36 to open or close the relief valve 11 according to the requirements of the room in respect to humidity changes; and as the said ratio valve is a delicate mechanism, it is utilized as a control device for insuring the operation of the more rugged relay relief valve mechanism 11 and 12, the operation of which directly controls the open and shut positions of the valve 6 which controls the pressure supply to the humidifier system. Ordinarily, when the ratio valve is open, the relief valve 12 of the relay valve mechanism is caused to open and vice versa. When the relay valve 12 is closed, the valve 6 controlling the pressure supply to the humidifier system is closed and the system is shut "off," and reversely, when the relay valve 12 is open, the pressure valve 6 is also open and the humidifying system is "on" to increase the humidity of the atmosphere. The wet element of the hygrometer being caused to contract or expand according to variations in rapidity of evaporation of the moisture surrounding it, it is essential that the means for supplying the moisture shall be positive in action and uniform in providing a water supply, and it is to this feature of the apparatus that our improvements are directed.

It will now be apparent that we have devised a novel and useful construction which embodies the features of advantage enumerated as desirable, and while we have in the present instance shown and described the preferred embodiment thereof which has been found in practice to give satisfactory and reliable results, it is to be understood that we do not restrict ourselves to the details, as the same are susceptible of modification in various particulars without departing from the spirit or scope of the invention.

Having now described our invention, what we claim as new and desire to secure by Letters Patent is:—

1. A hygrometer comprising dry and wet elements, means controlled by the conjoint operation of the expansion and contraction of said elements for controlling means adapted for putting a humidifier system into or out of operation in accordance with variations in atmospheric conditions, and means for supplying water to the wet element, said water supplying means comprising an inverted cap arranged longitudinally of the upper portion of the wet element, a source of water supply for feeding water to the interior of the cap, and a nozzle for supplying compressed air to the water for discharging it into the cap.

2. The invention according to claim 1, wherein further, the cap is provided with a spray nozzle within it, whereby the water may be discharged within the cap in the form of spray.

3. The invention according to claim 1, wherein further, the wet element is provided with a tubular covering of textile material, and means are provided for supporting the cap in contact with the textile covering.

4. The invention according to claim 1, wherein further, an air pressure pipe is provided for supplying a jet of air under pressure to the nozzle, and controlling means is provided for regulating the extent of air pressure delivered to the nozzle.

5. The invention according to claim 1, wherein further, a source of water supply is provided at a higher level than the air nozzle, and a check valve is arranged between the nozzle and the water supply pipe to prevent the air pressure entering the water supply pipe while permitting the water to be drawn through the check valve by reason of the suction produced by the air nozzle.

6. The invention according to claim 1, wherein further, the wet element is provided on its outer portion with a capillary structure below the cap for more fully distributing the water passing about its outer portion.

7. The invention according to claim 1, wherein the inverted cap is hinged in relation to the wet element and spring pressed upon the element, and the water supplying pipe is connected to and movable with the inverted cap.

8. A hygrometer having a horizontal wet element, combined with an inverted cap arranged above the wet element, means for supplying water to the space within the cap and throughout the length of the wet element, a source of water supply at a lower level than the cap and the wet element, an air blast nozzle for lifting the water from the lower level to the level of the cap, a trough arranged below the wet element, a wet bulb thermometer having its moisture pad extending into the trough, and a source of water supply communicating both with the trough and with the nozzle.

9. A hygrometer having a horizontal wet element, combined with a trough arranged immediately below the element, means for supplying water to the upper part of the wet element and having a communication also with the water trough, a source of air pressure, and a blast nozzle in communication with the source of air pressure for lifting the water from the level of the trough to the upper part of the wet element.

In testimony of which invention, we hereunto set our hands.

WILLIAM G. R. BRAEMER.
JOSEPH ARMSTRONG.